United States Patent
Choy et al.

(10) Patent No.: US 6,921,612 B2
(45) Date of Patent: Jul. 26, 2005

(54) NONAQUEOUS ELECTROLYTE COMPOSITION FOR IMPROVING OVERCHARGE SAFETY AND LITHIUM BATTERY USING THE SAME

(75) Inventors: Sang-hoon Choy, Daejeon (KR); Hyeong-gon Noh, Seoul (KR); Ha-young Lee, Cheonan (KR); Hee-young Sun, Yongin (KR); Ho-sung Kim, Yongin (KR)

(73) Assignee: Samsung SDI Co., Ltd., Suwon-si (KR)

( * ) Notice: Subject to any disclaimer, the term of this patent is extended or adjusted under 35 U.S.C. 154(b) by 265 days.

(21) Appl. No.: 10/271,732

(22) Filed: Oct. 17, 2002

(65) Prior Publication Data

US 2003/0118911 A1 Jun. 26, 2003

(30) Foreign Application Priority Data

Oct. 20, 2001 (KR) ..................................... 2001-0064940
Oct. 20, 2001 (KR) ..................................... 2001-0064948

(51) Int. Cl.$^7$ ................................................ H01M 6/16
(52) U.S. Cl. ....................... 429/326; 429/330; 429/199; 429/200; 429/231.95; 429/338; 429/339; 429/340; 429/341; 429/342
(58) Field of Search ................................ 429/326, 330, 429/199, 200, 231.95, 338, 339, 342, 340, 341

(56) References Cited

U.S. PATENT DOCUMENTS

| | | | |
|---|---|---|---|
| 5,580,684 A | 12/1996 | Yokoyama et al. | |
| 5,709,968 A | 1/1998 | Shimizu | |
| 5,763,119 A | 6/1998 | Adachi | |
| 5,776,627 A | 7/1998 | Mao et al. | |
| 5,858,573 A | 1/1999 | Abraham et al. | |

FOREIGN PATENT DOCUMENTS

| | | | |
|---|---|---|---|
| JP | 07-302614 | | 11/1995 |
| JP | 2000-58116 | * | 2/2000 |
| JP | 2001-23690 | * | 1/2001 |
| JP | 2001-357876 | * | 12/2001 |
| KR | 2001-0112594 | | 12/2001 |
| WO | WO 02/47192 | * | 6/2002 |

OTHER PUBLICATIONS

Office Action.

* cited by examiner

Primary Examiner—Laura Weiner
(74) Attorney, Agent, or Firm—Stein, McEwen & Bui, LLP

(57) ABSTRACT

Provided are a nonaqueous electrolyte for improving overcharge safety and a lithium battery using the same. The nonaqueous electrolyte according to the present invention forms a polymer due to its oxidative decomposition even if there is an increase in voltage due to overcharge of a battery by some uncontrollable conditions, so that overcharge current is continuously consumed, thereby protecting the battery. Therefore, overcharge safety of the battery can be enhanced, and occurrence of swelling is reduced. Also, deterioration in formation, standard capacity and cycle life characteristics can be prevented.

18 Claims, 3 Drawing Sheets

NONAQUEOUS ELECTROLYTE COMPOSITION FOR IMPROVING OVERCHARGE SAFETY AND LITHIUM BATTERY USING THE SAME

BACKGROUND OF THE INVENTION

1. Field of the Invention

The present invention relates to a nonaqueous electrolyte for improving overcharge safety and a lithium battery using the same.

2. Description of the Related Art

According to the development of advanced electronic devices, there is an increasing demand for small, lightweight portable electronic devices and equipment. Thus, there is a need for batteries having high energy density characteristics so as to supply a power to such devices and equipment, and research into such lithium batteries are being vigorously carried out.

Figure 1:
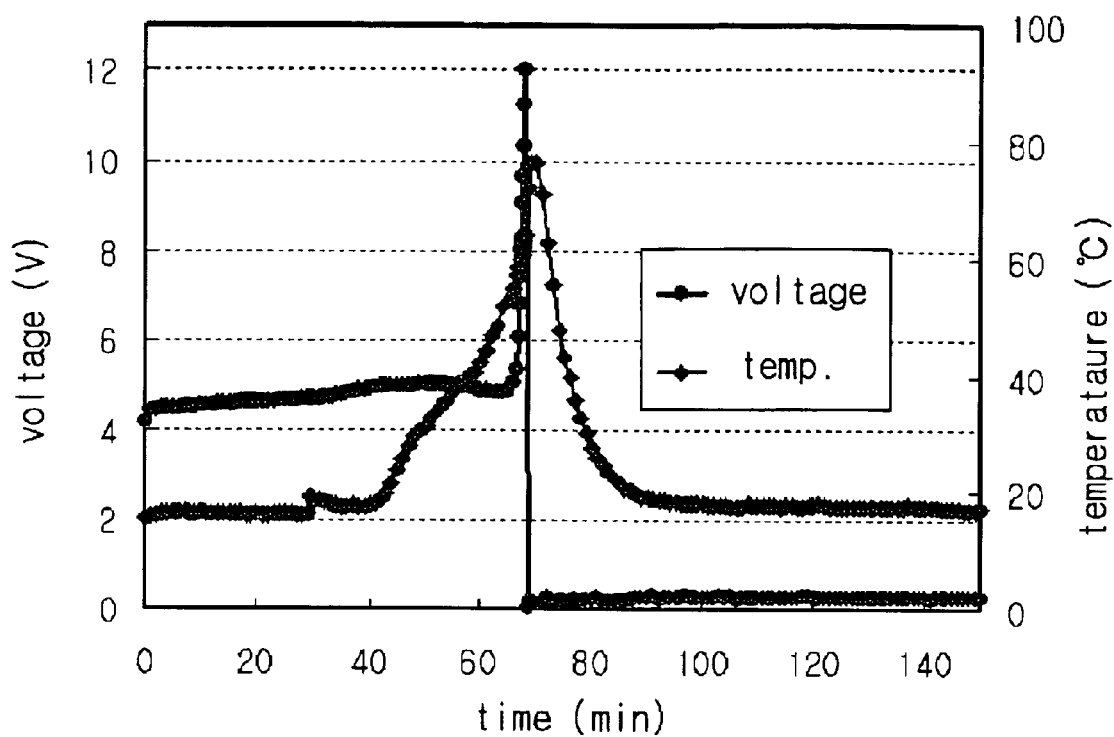
FIG. 1 is a graph showing the results of overcharge test for a battery using an electrolyte prepared in Comparative Example 1.

A lithium battery comprises a cathode, an anode, an electrolyte for providing for a movement path of lithium ions and a separator disposed between the cathode and the anode. Lithium batteries produce an electrical energy by intercalation/deintercalation of lithium ions during oxidation and reduction occurring at the cathode and the anode. However, in the case where a battery is overcharged due to malfunction of a charger, for example, causing a sharp rise in voltage, excess lithium is precipitated at the cathode and excess lithium is intercalated into the anode. If both the cathode and the anode are thermally unstable, an organic solvent of the electrolyte is decomposed to cause rapid heat generation, such as thermal runaway, adversely affecting safety of the battery.

To overcome the foregoing disadvantage, various attempts to suppress overcharge of a battery by changing the composition of an electrolyte or adding additives to the electrolyte have been proposed in the field of lithium ion batteries. For example, U.S. Pat. No. 5,580,684 discloses a method of improving safety of a battery by increasing a self-extinguishing property of an electrolyte by adding phosphoric acid esters, such as trimethyl phosphate, tri(trifluoroethyl)phosphate or tri(2-chloroethyl)phosphate, to the electrolyte.

U.S. Pat. No. 5,776,627 discloses a method of enhancing battery safety by preventing migration of lithium by adding some additives such as thiophene, biphenyl or furan to be polymerized in the event of failure of a battery, and by allowing a safety vent of the battery to be easily opened by the gas produced by the additives.

Similarly, methods for enhancing battery safety are disclosed in U.S. Pat. Nos. 5,763,119, 5,709,968 and 5,858,573 in which an electrolyte includes additive such as 1,2-dimethoxy-4-bromo-benzene, 2-chloro-p-xyline and 4-chloro-anisol, and 2,7-diacetyl thianthrene, respectively.

Also, Japanese Patent Laid-Open Publication No. Hei 7-302614 discloses a battery protecting method in which overcharge current is consumed by forming a polymer using a benzene compound.

However, such conventional additives may be polymerized even under normal operating conditions or produce a large amount of gas due to oxidative decomposition, resulting in swelling of a battery. Also, use of such conventional additives may deteriorate various battery performance such as formation, standard capacity or cycle life characteristics.

SUMMARY OF THE INVENTION

To solve the above-described problems, it is a first object of the present invention to provide a nonaqueous electrolyte which can improve battery safety by suppressing risks of rupture, ignition or explosion of a battery when the battery is overcharged due to some uncontrolled conditions such as failure of a charger or when the battery is exposed to high temperature, which can suppress swelling, and which can prevent deterioration in formation, standard capacity and cycle life characteristics of the battery.

It is a second object of the present invention to provide a lithium battery with improved safety.

To accomplish the first object, the present invention provides a nonaqueous electrolyte comprising an organic solvent, a lithium salt, and a hydride of a compound represented by the formula 1:

[Formula 1]

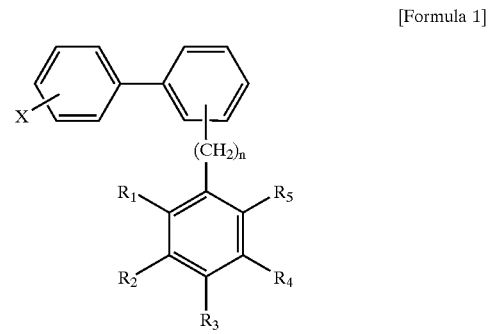

wherein $R_1$, $R_2$, $R_3$, $R_4$, and $R_5$ are the same or different, and are independently hydrogen, a C1–C4 alkyl, a C1–C4 alkoxy, nitro or amine group, X is halogen, C1–C4 alkyl, C1–C5 alkoxy, nitro or amine group, and n is an integer between 1 and 10.

In an embodiment of the present invention, the amount of the compound represented by the formula 1 is 1 to 20% by weight based on the total amount of a mixed solution of the organic solvent and the lithium salt.

In an embodiment of the present invention, the degree of hydrogenation of the hydride of the compound represented by the formula 1 is in the range of 10 to 70%.

Examples of the hydride of the compound represented by the formula 1 include a hydride of a compound represented by the formula 2:

[Formula 2]

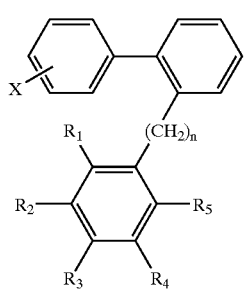

wherein $R_1, R_2, R_3, R_4, R_5$, X and n are the same as defined above.

Also, examples of the hydride of the compound represented by the formula 2 include a hydride of o-benzyl biphenyl represented by the formula 3:

[Formula 3]

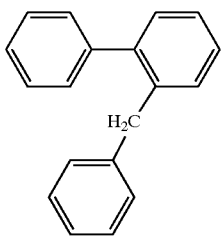

3

Also, examples of the hydride of the compound represented by the formula 1 include a hydride of a compound represented by the formula 4:

4

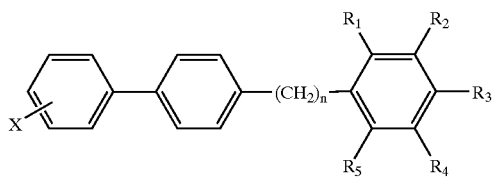

wherein $R_1, R_2, R_3, R_4, R_5$, X and n are the same as defined above.

Examples of the hydride of the compound represented by the formula 4 include a hydride of p-benzyl biphenyl represented by the formula 5:

5

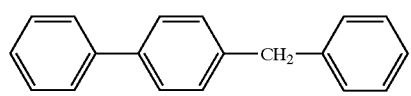

In accordance with another aspect of the present invention, there is provided a lithium secondary battery using the nonaqueous electrolyte.

The present invention will now be described in detail.

The present invention provides a nonaqueous electrolyte comprising an organic solvent, a lithium salt, and a hydride of a compound represented by the formula 1:

[Formula 1]

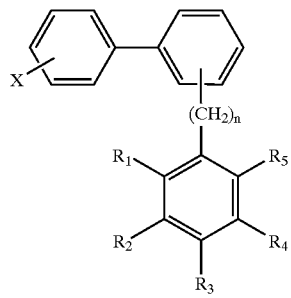

wherein $R_1, R_2, R_3, R_4$, and $R_5$ are the same or different, and are independently hydrogen, a C1–C4 alkyl, a C1–C4 alkoxy, nitro or amine group, X is halogen, C1–C4 alkyl, C1–C5 alkoxy, nitro or amine group, and n is an integer between 1 and 10.

Unlike conventional electrolyte additives, e.g., terphenyl, while the compound represented by the formula 1 affects little on battery performance under normal use condition, that is, at 2.75–4.2 V, the additive is oxidized during overcharge of a battery to cause polymerization at the surface of a cathode so that a coating is formed on the cathode surface.

Accordingly, cathode-anode resistance increases and the polymerizable coating having some ionic and conductive properties causes a soft short (shunting) effect between the cathode and the anode, consuming overcharge current, thereby protecting the battery.

During overcharge, the gases generated due to electrolyte decomposition react with a benzyl group to create a new substance. Thus, the present electrolyte additives considerably suppress gas generation compared to conventional additives, thereby presumably preventing swelling of a battery.

Therefore, use of an electrolyte having the hydride of the compound represented by the formula 1, and a lithium salt dissolved in an organic solvent, presents deterioration of formation, standard capacity, swelling and cycle life characteristics while ensuring overcharge safety of the battery.

In particular, in the hydride of the compound represented by the formula 1, an oxidative decomposition potential of an electrolyte moves further in a positive (+) direction than in the unhydrogenated compound. Thus, unfavorable side effects, e.g., polymerization, which may occur when the battery is used for a long period of time at normal conditions, can be further suppressed, thereby ensuring overcharge safety of the battery while preventing deterioration of formation, standard capacity, swelling and cycle life characteristics.

The hydride of the compound represented by the formula 1 is preferably added in an amount of 1 to 20% by weight, more preferably 3 to 15% by weight, based on the weight of a mixed solution of the organic solvent and the lithium salt. If the amount is less than 1%, desired effects are difficult to achieve. If the amount is greater than 20%, cycle life characteristics undesirably deteriorate.

The hydride of the compound represented by the formula 1 has a substituted or unsubstituted phenylalkyl group bound to a biphenyl group. The substituted or unsubstituted phenylalkyl group may be introduced at any of ortho (o), meta (m) and para (p) positions of the biphenyl group, preferably at o- or p-position.

The compound with phenylalkyl substituted at o-position is represented by the formula 2:

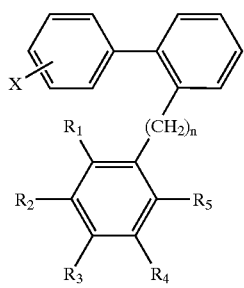

[Formula 2]

wherein $R_1$, $R_2$, $R_3$, $R_4$, $R_5$, X and n are the same as defined above.

The compound represented by the formula 2 is preferably o-benzyl biphenyl represented by the formula 3:

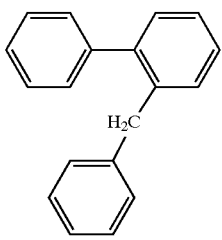

[Formula 3]

3

The compound with phenylalkyl substituted at p-position is represented by the formula 4:

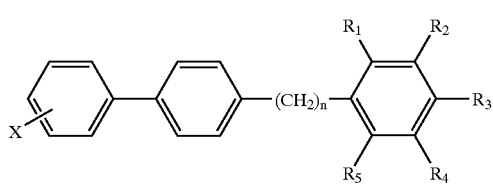

4 wherein $R_1$, $R_2$, $R_3$, $R_4$, $R_5$, X and n are the same above.

The compound represented by the formula 4 is preferably p-benzyl biphenyl represented by the formula 5.

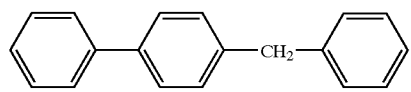

5

In particular, in the hydride of the compound represented by the formula 1, an oxidative decomposition potential of an electrolyte moves further in a positive (+) direction than in the unhydrogenated compound. Thus, unfavorable side effects, e.g., polymerization, which may occur when the battery is used for a long period of time at normal conditions, can be further suppressed, thereby ensuring overcharge safety of the battery while preventing deterioration of formation, standard capacity, swelling and cycle life characteristics. The degree of hydrogenation of the hydride of the compound represented by the formula 1 is preferably in the range of 10 to 70%, more preferably in the range of 30 to 50%. If the degree of hydrogenation is less than 10%, desired effects are difficult to achieve. If the degree of hydrogenation is greater than 70%, oxidation currents are undesirably reduced.

Any organic solvent useful for the electrolytes can be generally used for manufacture of lithium batteries without particular limitation, and examples thereof include at least one selected from the group consisting of ethylene carbonate, propylene carbonate, dimethyl carbonate, diethyl carbonate, dipropyl carbonate, ethylmethyl carbonate, dimethyl sulfoxide, acetonitrile, dimethoxyethane, tetrahydrofuran, acetone, dimethylformamide, cyclohexanone, fluorobenzene and N-methyl-2-pyrrolidone. The content of the organic solvent is in the range typically used for the manufacture of lithium batteries.

Lithium salts useful for the electrolyte include, but not limited to, any lithium compounds capable of being dissociated in an organic solvent to produce lithium ions, and examples thereof include at least one ionic lithium salt selected from the group consisting of lithium perchloric acid ($LiClO_4$), lithium tetrafluoroboric acid ($LiBF_4$), lithium hexafluorophosphoric acid ($LiPF_6$), lithium trifluoromethanesulfonic acid ($LiCF_3SO_3$) and lithium bis(trifluoromethanesulfonyl)amide ($LiN(CF_3SO_2)_2$). The content of the lithium salt is in the range typically used for the manufacture of lithium batteries. The organic electrolyte containing an inorganic salt serves as a path for moving lithium ions in a direction of current flow.

The electrolyte can be used for any method of manufacturing lithium batteries without limitation. Exemplary manufacturing methods are as follows:

(1) An electrode assembly comprised of an anode/a cathode/a separator is put into a battery case and the electrolyte according to the present invention is inserted into the electrode assembly, thereby completing a lithium battery;

(2) A polymer electrolyte prepared by mixing a matrix-forming polymer resin and the electrolyte according to the present invention is applied to an electrode or a separator to form an electrode assembly, and the electrode assembly is put into a battery case, thereby completing a lithium battery; or (3) A polymer electrolyte composition comprising a prepolymer or polymerizable monomer as a matrix-forming resin and an electrolyte according to the present invention, is applied to an electrode or a separator to form an electrode assembly, the electrode assembly is put into a battery case and then polymerization is carried out, thereby completing a lithium battery.

Any separator that can be generally used in manufacturing lithium batteries is used without any limitations, and examples thereof include a polyethylene or polypropylene porous layer less reactive with an organic solvent and suitable for attaining a safe battery.

Examples of the matrix forming polymer resin include, but not limited to, any material useful for a binder of an electrode plate, and examples include a vinylidenefluoride/hexafluoropropylene copolymer, polyvinylidenefluoride, polyacrylonitrile, polymethylmethacrylate and mixtures thereof.

The polymer electrolyte may further include a polymer filler serving to enhance the mechanical strength of the polymer electrolyte, and examples of the filler include silica, kaolin and alumina.

The polymer electrolyte may further include a plasticizer, and examples of the plasticizer include ethylene glycol deriviatives, oligomers thereof and organic carbonates. Examples of the ethylene glycol derivatives include ethylene glycol diacetate, ethylene glycol dibutylether, ethylene glycol dibutyrate, ethylene glycol dipropionate, propylene glycol methyletheracetate and mixture thereof. Examples of the organic carbonates include ethylene carbonate, propylene carbonate, diethyl carbonate, dimethyl carbonate, and mixtures thereof.

The alkyl used for the compound of the present invention includes a straight-chain or branched radical having 1–10 carbon atoms, preferably 1–8 carbon atoms. Examples of such radical include methyl, ethyl, n-propyl, isopropyl, n-butyl, isobutyl, sec-butyl, t-butyl, pentyl, isoamyl, hexyl, octyl and the like, more preferably a lower alkyl radical having 1–4 carbon atoms.

The alkoxy used for the compound of the present invention includes a straight-chain or branched oxygen-containing radical having a C1—C10 alkyl, more preferably a lower alkoxy radical having 1–6 carbon atoms. Examples of such radical include methoxy, ethoxy, propoxy, butoxy, t-butoxy and the like, more preferably a lower alkoxy radical having 1–4 carbon atoms. The alkoxy radical is further substituted with one or more halo atoms such as fluoro, chloro or bromo to provide a haloalkoxy radical, more preferably a lower haloalkoxy having 1–4 carbon atoms. Examples of such haloalkoxy radical include fluoromethoxy, chloromethoxy, trifluoromethoxy, trifluoroethoxy, fluoroethoxy and fluoropropoxy and the like.

The lithium battery containing the electrolyte according to the present invention is not particularly limited in its type, and the present invention can be applied to primary batteries, secondary batteries or lithium sulfur batteries.

The lithium battery containing the electrolyte according to the present invention is not particularly limited in its shape, and the present invention can be applied to both rectangular and cylindrical batteries.

To further illustrate the present invention in greater detail, the following Examples will be given. However, it is to be understood that the present invention is not restricted thereto.

1. Preparation of Cathode

A mixture (slurry or paste) prepared by dissolving LiCoO$_2$ employed as a cathode active material, Super-P (manufactured by M.M.M. Corp.) employed as a conductive agent and polyvinylidenefluoride (PVDF) employed as a binder in N-methyl-2-pyrrolidone (NMP) employed as an organic solvent, was uniformly applied onto both surfaces of an aluminum current collector to prepare a cathode coated with an active material, followed by drying to remove the organic solvent and compression molding using a roll press machine, thereby manufacturing a cathode of 0.147 mm in thickness.

2. Manufacture of Anode

A mixture (slurry or paste) prepared by dissolving mesocarbon fiber (MCF) (manufactured by Petoca Ltd.) employed as an anode active material and PVDF employed as a binder in NMP employed as an organic solvent, was applied onto both surfaces of a copper current collector to prepare an anode coated with an active maerial, followed by drying to remove the organic solvent and compression molding using a roll press machine, thereby manufacturing an anode of 0.178 mm in thickness.

3. Preparation of Electrode Assembly

The manufactured cathode and anode were stacked with a polyethylene porous layer, which is less reactive with an organic solvent and is suitably thick, that is, 0.024 mm, disposed therebetween, thereby fabricating a rectangular battery having a capacity of approximately 900 mAh.

4. Preparation of Electrolyte

Example 1

LiPF$_6$ as a lithium salt was dissolved to a final concentration of 1.15 M in a mixed solvent of ethylene carbonate (EC)/ethylmethyl carbonate (EMC)/propylene carbonate (PC)/fluorobenzene (FB) (volume ratio=30/55/5/10) to obtain a mixed solution. To the obtained mixed solution was added 5% by weight of a hydride of o-benzyl biphenyl represented by the formula 3 (30% in degree of hydrogenation, manufactured by Nippon Steel Chemical Co.), based on the total amount of the mixed solution, thereby obtaining a desired electrolyte:

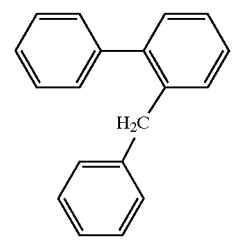

3

Example 2

LiPF$_6$ as a lithium salt was dissolved to a final concentration of 1.15 M in a mixed solvent of EC/EMC/PC/FB (volume rate=30/55/5/10) to obtain a mixed solution. To the obtained mixed solution was added 5% by weight of a hydride of o-benzyl biphenyl represented by the formula 3 (50% in degree of hydrogenation, manufactured by Nippon Steel Chemical Co.), based on the total amount of the mixed solution, thereby obtaining a desired electrolyte.

Example 3

LiPF$_6$ as a lithium salt was dissolved to a final concentration of 1.15 M in a mixed solvent of EC/EMC/PC/FB (volume ratio=30/55/5/10) to obtain a mixed solution. To the obtained mixed solution was added 10% by weight of a hydride of o-benzyl biphenyl represented by the formula 3 (50% in degree of hydrogenation, manufactured by Nippon Steel Chemical Co.), based on the total amount of the mixed solution, thereby obtaining a desired electrolyte.

Comparative Example 1

LiPF$_6$ as a lithium salt was mixed to a final concentration of 1.15. M in a mixed solvent of EC/EMC/PC/FB (volume ratio=30/55/5/10) to obtain a desired electrolyte.

Comparative Example 2

LiPF$_6$ as a lithium salt was mixed to a final concentration of 1.15 M in a mixed solvent of EC/EMC/PC/FB (volume ratio=30/55/5/10) to obtain a mixed solution. To the mixed solution was added 5% by weight of o-terphenyl, thereby obtaining a desired electrolyte.

5. Preparation of Lithium Ion Battery

A separator was disposed on upper and bottom surface of the prepared electrode assembly, and the resultant structure was wound and compressed, followed by putting the same into a 34 mm×50 mm×06 mm rectangular can. Each of the obtained electrolytes was injected into the can, thereby preparing lithium ion batteries.

Test Example 1: Overcharge Test

The prepared lithium ion batteries were charged with a charging current of 950 mA (1 C) at room temperature to become a voltage of 4.2 V, and charged for 3 hours at a constant voltage of 4.2 V to reach a fully charged state. Overcharging was performed by applying a charging current of 950 mA (1 C) between a cathode and an anode of each fully charged battery for approximately 2.5 hours, and changes in charging voltage and temperature were observed.

FIG. 1 shows overcharge test results on the lithium ion battery prepared in Comparative Example 1 with a charging current of 950 mA (1 C). As shown in FIG. 1, when an external voltage of 12 V was applied, separator shutdown may be resulted from exhaustion of electrolyte or a temperature rise due to the oxidation between a cathode/anode and an electrolyte. Also, when a high current of approximately 1 C is applied to the lithium ion battery, thermal runaway occurs to the battery to cause dissolution of a separator, resulting in internal short, and heat or fire.

Figure 2:
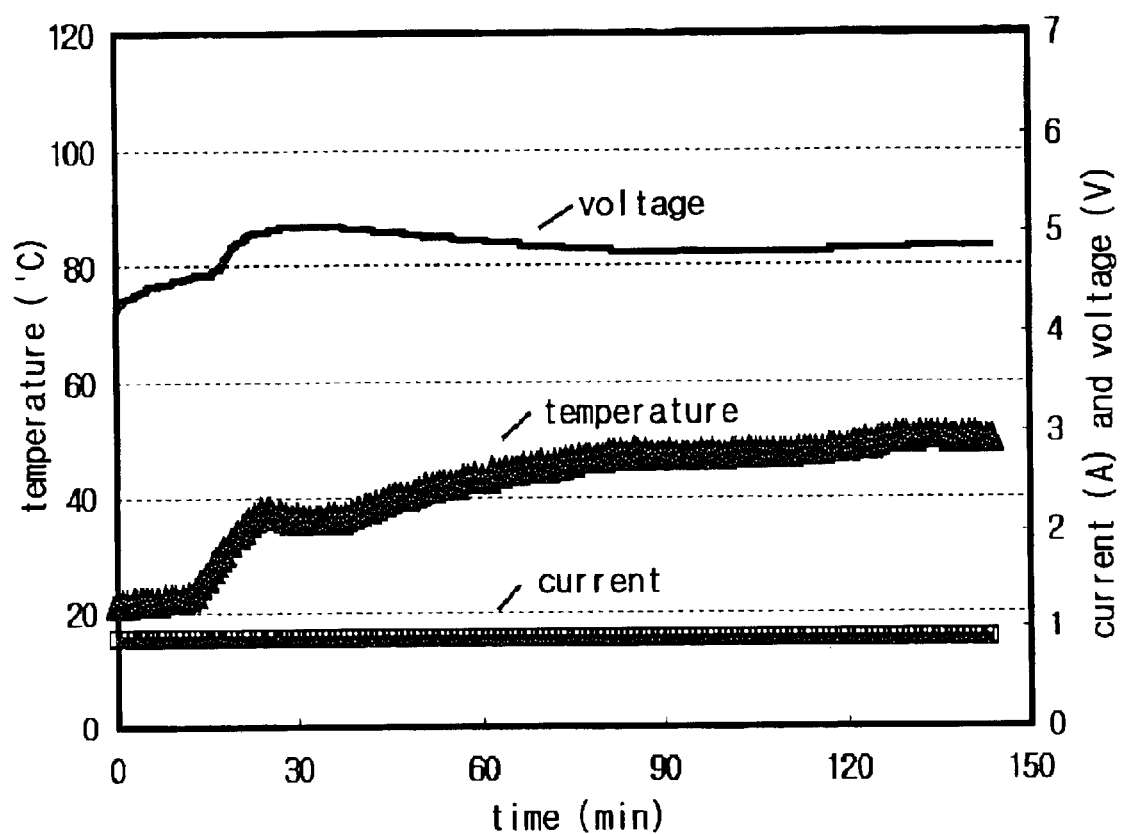
FIG. 2 is a graph showing the results of overcharge test for a battery using an electrolyte prepared in Example 1 of the present invention.

FIG. 2 shows overcharge test results performed on the lithium ion battery prepared in Example 1 under the same conditions as in Comparative Example 1. As shown in FIG. 2, polymerization takes place due to an additive of the present invention approximately 10 minutes after the overcharge test, so that the temperature rises. However, since overcharging current is continuously consumed, a voltage rise if suppressed at approximately 5 V. Also, since heat generation due to oxidative decomposition of an electrolyte and battery materials is also suppressed, the temperature of a battery surface is controlled to be approximately 50° C. or below. Since thermal runaway is fundamentally suppressed, battery safety can be ensured.

Test Example 2: Formation and Swelling Characteristics

Observation of formation capacity, standard capacity and swelling characteristics before and after formation were carried out on the batteries prepared in Examples 1–3 and Comparative Examples 1 and 2 and the results thereof are listed in Table 1. The batteries were charged at 0.2 C to a voltage of 4.2 V and then were discharged at 0.2 C to an end voltage of 2.75 V. To determine swelling characteristics, thicknesses of the batteries were measured.

Test Example 3: High-Rate Characteristics

High-rate (2 C) characteristics of the batteries prepared in Examples 1–6 and Comparative Examples 1–2 were measured and the results thereof are listed in Table 1.

TABLE 1

|  | Swelling | Formation capacity | | |
|---|---|---|---|---|
|  | before and after formation | Charge | Discharge | Efficiency (%) | Capacity (mAh) |
| Example 1 | 5.07 | 990 | 930 | 94 | 945 |
| Example 2 | 5.06 | 960 | 930 | 97 | 960 |
| Example 3 | 5.08 | 980 | 910 | 93 | 930 |
| Comparative Example 1 | 5.09 | 958 | 883 | 92 | 934 |
| Comparative Example 2 | 5.75 | 939 | 865 | 92 | 851 |

As shown in Table 1, the lithium battery prepared in Comparative Example 2, containing a conventional overcharge preventing additive, is higher than that prepared in Comparative Example 2 in view of degree of swelling, which is because a large amount of gas is produced due to oxidative decomposition of the overcharge preventing additive.

However, the lithium batteries prepared in Examples 1–3 in which overcharge preventing additives of the present invention are used, show substantially the same degree of swelling compared to the lithium battery prepared in Comparative Example 1. That is to say, the additives of the present invention suppress swelling.

The lithium batteries according to the present invention are also highly effective in view of formation and standard capacity characteristics.

Test Example 4: Cycle Life Characteristics

Charge/discharge cycle life characteristics were tested on the lithium batteries prepared in Example 2 and Comparative Example 2. Charge/discharge cycling tests were carried out under the conditions of constant current and constant voltage at 1 C and to 2.7–4.2 V. The constant voltage period was 1/10 the constant current period. The capacity and charge/discharge cycle life characteristics of the batteries are shown in FIG. 3.

Figure 3:
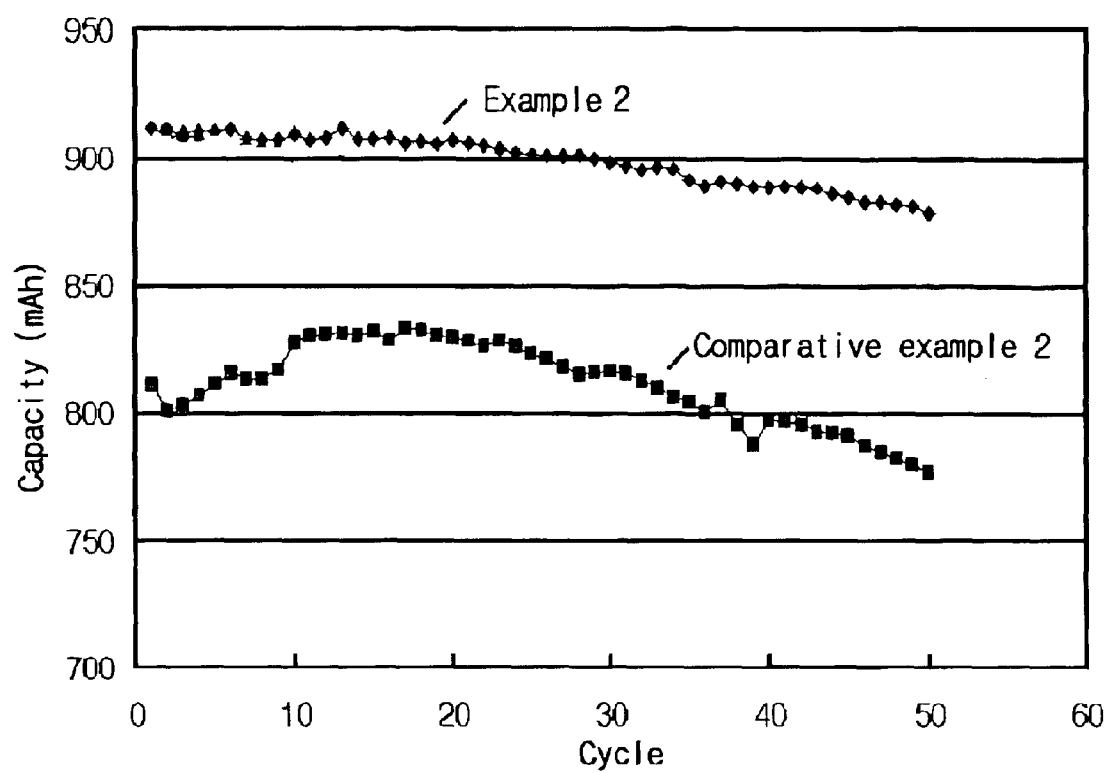
FIG. 3 shows cycle characteristics of batteries using electrolytes prepared in Example 2 and Comparative Example 2.
Figure 1:
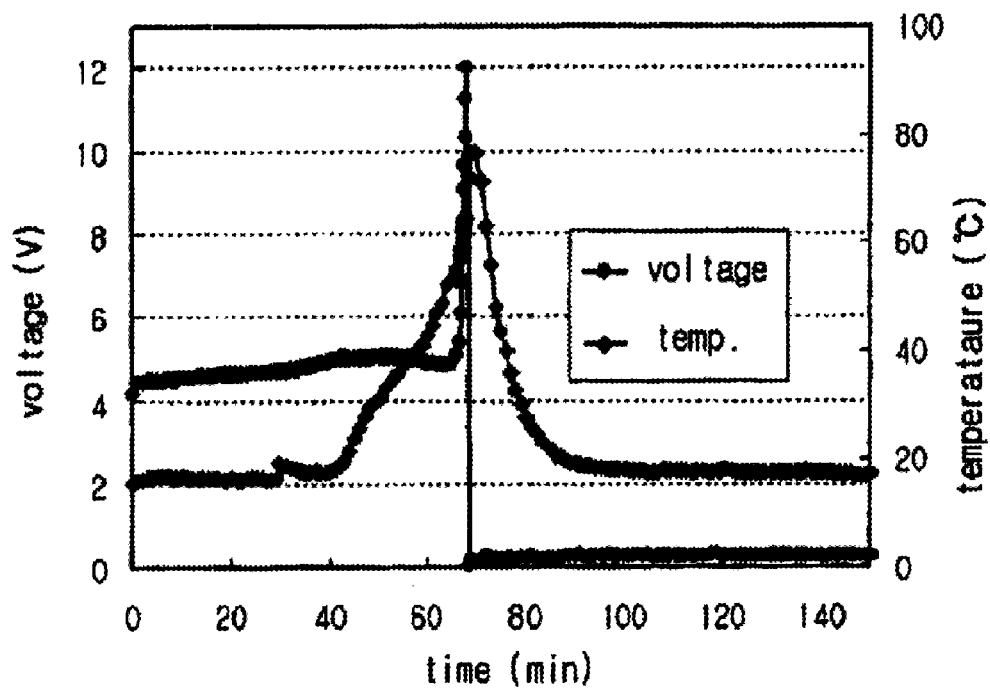
Figure 2:
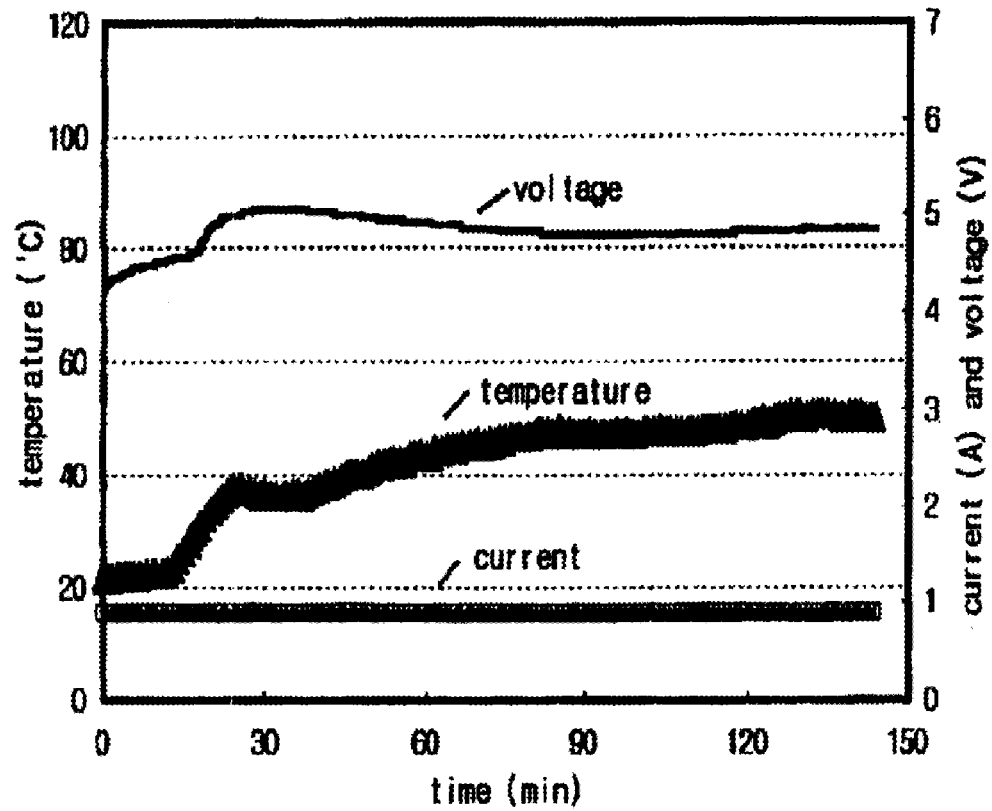
Figure 3:
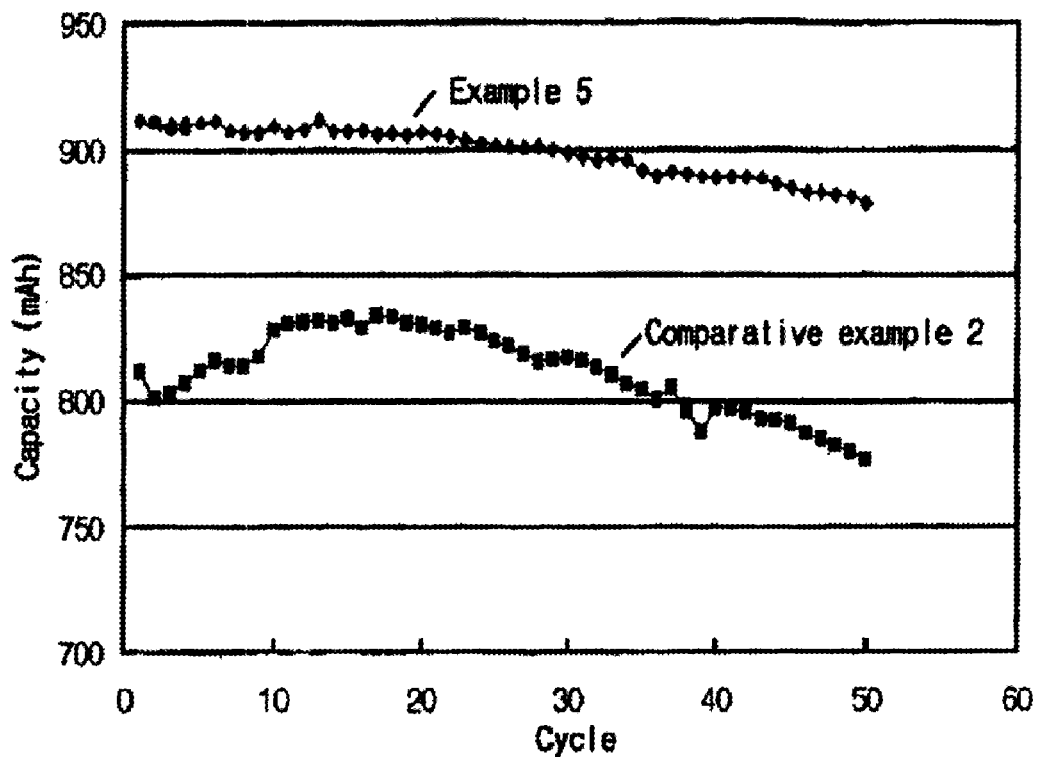

As shown in FIG. 3, the lithium battery using the overcharge preventing additive of Example 2 was proven to have higher capacity after 50 cycles, that is, better cycle life characteristics, than the lithium battery using the conventional overcharge preventing additive.

As described above, the nonaqueous electrolyte according to the present invention forms a polymer due to its oxidative decomposition even if there is an increase in voltage due to overcharge of a battery by some uncontrollable conditions, so that overcharge current is continuously consumed, thereby protecting the battery. Therefore, overcharge safety of the battery can be enhanced, and occurrence of swelling is reduced. Also, deterioration in formation, standard capacity and cycle life characteristics can be prevented. Further, the nonaqueous electrolyte according to the present invention can be advantageously applied to lithium batteries and the like.

What is claimed is:

1. A nonaqueous electrolyte comprising:
   an organic solvent;
   a lithium salt; and a compound represented by Formula 1, a hydride thereof or a mixture thereof wherein: Formula 1 is

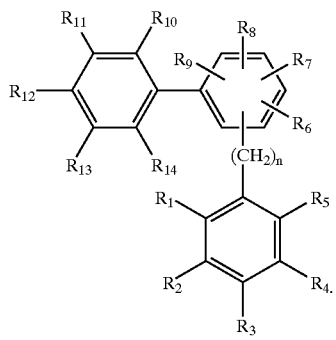

$R_1, R_2, R_3, R_4, R_5, R_6, R_7, R_8, R_9, R_{10}, R_{11}, R_{12}, R_{13}$ and $R_{14}$ are the same or different, and are independently hydrogen, hydrogen, hydroxy, halogen, a C1–C10 alkyl, a C1–C10 alkoxy, nitro or amine group, X is halogen, a C1–C10 alkoxy, nitro or amine group, and n is an integer between 1 and 10.

2. The nonaqueous electrolyte according to claim 1, wherein an amount of the compound represented by the Formula 1 is at or between 1 and 20% by weight based on a total amount of a mixed solution of the organic solvent and the lithium salt.

3. The nonaqueous electrolyte according to claim 2, wherein the amount of the compound represented by the Formula 1 is at or between 3 and 15% by weight based on the total amount of a mixed solution of the organic solvent and the lithium salt.

4. The nonaqueous electrolyte according to claim 1, wherein a degree of hydrogenation of the hydride of the compound represented by the Formula 1 is in a range at or between 10 and 70%.

5. The nonaqueous electrolyte according to claim 4, wherein the degree of hydrogenation is in the range at or between 30 and 50%.

6. The nonaqueous electrolyte according to claim 1, wherein:

the compound represented by the Formula 1 includes a compound represented by Formula 2, Formula 2 is

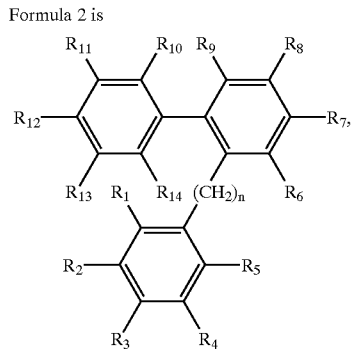

and $R_1, R_2, R_3, R_4, R_5, R_6, R_7, R_8, R_9, R_{10}, R_{11}, R_{12}, R_{13}$ and $R_{14}$ and n are as defined in relation to Formula 1.

7. The nonaqueous electrolyte according to claim 6, wherein:

the compound represented by the Formula 2 includes an o-benzyl biphenyl represented by Formula 3, and Formula 3 is 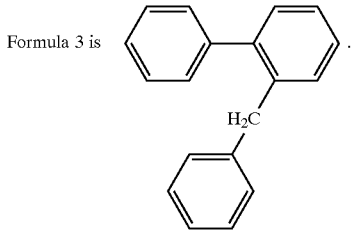.

8. The nonaqueous electrolyte according to claim 1, wherein:

the compound represented by the Formula 1 includes a compound represented by Formula 4, Formula 4 is

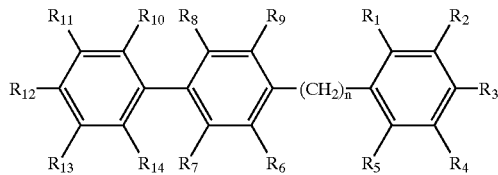

and $R_1, R_2, R_3, R_4, R_5, R_6, R_7, R_8, R_9, R_{10}, R_{11}, R_{12}, R_{13}$ and $R_{14}$ and n are as defined in relation to Formula 1.

9. The nonaqueous electrolyte according to claim 8, wherein:

the compound represented by the Formula 4 includes a p-benzyl biphenyl represented by Formula 5, and Formula 5 is 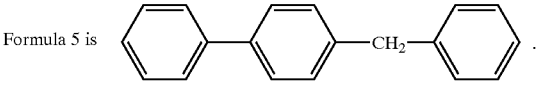.

10. The nonaqueous electrolyte according to claim 1, wherein the organic solvent comprises ethylene carbonate, propylene carbonate, dimethyl carbonate, diethyl carbonate, dipropyl carbonate, ethylmethyl carbonate, dimethyl sulfoxide, acetonitrile, dimethoxyethane, tetrahydrofuran, acetone, dimethylformamide, cyclohexanone, fluorobenzene, or N-methyl-2-pyrrolidone.

11. The nonaqueous electrolyte according to claim 1, wherein the lithium salt comprises lithium perchloric acid ($LiClO_4$), lithium tetrafluoroboric acid ($LiBF_4$), lithium hexafluorophosphoric acid ($LiPF_6$), lithium trifluoromethanesulfonic acid ($LiCF_3SO_3$), or lithium bis(trifluoromethansulfonyl)amide ($LiN(CF_3SO_2)_2$).

12. A lithium battery comprising:
    an anode;
    a cathode which intercalates lithium ions with the anode;
    a separator disposed between the anode and the cathode; and
    a nonaqueous electrolyte disposed between the anode and the cathode and which comprises the nonaqueous electrolyte according to claim 1.

13. A lithium battery comprising:

an anode;

a cathode which intercalates lithium ions with the anode;

a separator disposed between the anode and the cathode; and a nonaqueous electrolyte disposed between the anode and the cathode and which comprises the nonaqueous electrolyte according to claim 2.

14. A lithium battery comprising:

an anode;

a cathode which intercalates lithium ions with the anode;

a separator disposed between the anode and the cathode; and a nonaqueous electrolyte disposed between the anode and the cathode and which comprises the nonaqueous electrolyte according to claim 4.

15. A lithium battery comprising:

an anode;

a cathode which intercalates lithium ions with the anode;

a separator disposed between the anode and the cathode; and a nonaqueous electrolyte disposed between the anode and the cathode and which comprises the nonaqueous electrolyte according to claim 6.

16. A lithium battery comprising:

an anode;

a cathode which intercalates lithium ions with the anode;

a separator disposed between the anode and the cathode; and a nonaqueous electrolyte disposed between the anode and the cathode and which comprises the nonaqueous electrolyte according to claim 7.

17. A lithium battery comprising:

an anode;

a cathode which intercalates lithium ions with the anode;

a separator disposed between the anode and the cathode; and a nonaqueous electrolyte disposed between the anode and the cathode and which comprises the nonaqueous electrolyte according to claim 8.

18. A lithium battery comprising:

an anode;

a cathode which intercalates lithium ions with the anode;

a separator disposed between the anode and the cathode; and a nonaqueous electrolyte disposed between the anode and the cathode and which comprises the nonaqueous electrolyte according to claim 9.

\* \* \* \* \*

UNITED STATES PATENT AND TRADEMARK OFFICE
CERTIFICATE OF CORRECTION

PATENT NO. : 6,921,612 B2  Page 1 of 1
APPLICATION NO. : 10/271732
DATED : July 26, 2005
INVENTOR(S) : Sang-hoon Choy et al.

It is certified that error appears in the above-identified patent and that said Letters Patent is hereby corrected as shown below:

Column 11,
Line 20, delete "hydrogen" second occurrence.
Line 22, insert -- C1-C10 alkyl, -- after "halogen,".

Column 12,
Line 58, change "bis(trifluoromethansulfonyl)amide" to -- bis(trifluoromethanesulfonyl) amide --.

Signed and Sealed this

Twentieth Day of June, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,921,612 B2 | Page 1 of 1 |
| APPLICATION NO. | : 10/271732 | |
| DATED | : July 26, 2005 | |
| INVENTOR(S) | : Sang-hoon Choy et al. | |

It is certified that error appears in the above-identified patent and that said Letters Patent is hereby corrected as shown below:

Column 11, line 20, delete "hydrogen" second occurrence.

Column 11, line 22, insert --C1-C10 alkyl,-- after "halogen,".

Column 12, line 58, change "bis(trifluoromethansulfonyl)amide" to --bis(trifluoromethanesulfony)amide--.

Signed and Sealed this

Twenty-second Day of August, 2006

JON W. DUDAS
*Director of the United States Patent and Trademark Office*

UNITED STATES PATENT AND TRADEMARK OFFICE
CERTIFICATE OF CORRECTION

PATENT NO. : 6,921,612 B2  Page 1 of 14
APPLICATION NO. :10/271732
DATED : July 26, 2005
INVENTOR(S) : Choy et al.

It is certified that error appears in the above-identified patent and that said Letters Patent is hereby corrected as shown below:

PLEASE DELETE THE ENTIRE PATENT TITLE PAGE, DRAWING SHEETS 1-3, AND SPECIFICATION COLUMNS 1 THROUGH COLUMNS 14 AND INSERT THE TITLE PAGE, DRAWING SHEETS 1-4 AND SPECIFICATION COLUMNS 1 THROUGH COLUMNS 16 AS ATTACHED

Signed and Sealed this

Eighth Day of April, 2008

JON W. DUDAS
*Director of the United States Patent and Trademark Office*

(12) United States Patent
Choy et al.

(10) Patent No.: US 6,921,612 B2
(45) Date of Patent: Jul. 26, 2005

(54) NONAQUEOUS ELECTROLYTE COMPOSITION FOR IMPROVING OVERCHARGE SAFETY AND LITHIUM BATTERY USING THE SAME

(75) Inventors: Sang-hoon Choy, Daejeon (KR); Hyeong-gon Noh, Seoul (KR); Ha-young Lee, Cheonan (KR); Hee-young Sun, Yongin (KR); Ho-sung Kim, Yongin (KR)

(73) Assignee: Samsung SDI Co., Ltd., Suwon-si (KR)

(*) Notice: Subject to any disclaimer, the term of this patent is extended or adjusted under 35 U.S.C. 154(b) by 265 days.

(21) Appl. No.: 10/271,732

(22) Filed: Oct. 17, 2002

(65) Prior Publication Data

US 2003/0118911 A1 Jun. 26, 2003

(30) Foreign Application Priority Data

Oct. 20, 2001 (KR) .................. 2001-0064940
Oct. 20, 2001 (KR) .................. 2001-0064948

(51) Int. Cl.$^7$ .................................................. H01M 6/16
(52) U.S. Cl. .................. 429/326; 429/330; 429/199; 429/200; 429/231.95; 429/338; 429/339; 429/340; 429/341; 429/342
(58) Field of Search .................. 429/326, 330, 199, 429/200, 231.95, 338, 339, 342, 340, 341

(56) References Cited

U.S. PATENT DOCUMENTS

| | | |
|---|---|---|
| 5,580,684 A | 12/1996 | Yokoyama et al. |
| 5,709,968 A | 1/1998 | Shimizu |
| 5,763,119 A | 6/1998 | Adachi |
| 5,776,627 A | 7/1998 | Mao et al. |
| 5,858,573 A | 1/1999 | Abraham et al. |

FOREIGN PATENT DOCUMENTS

| | | |
|---|---|---|
| JP | 07-302614 | 11/1995 |
| JP | 2000-58116 | * 2/2000 |
| JP | 2001-23690 | * 1/2001 |
| JP | 2001-357876 | * 12/2001 |
| KR | 2001-0112594 | 12/2001 |
| WO | WO 02/47192 | * 6/2002 |

OTHER PUBLICATIONS

Office Action.

* cited by examiner

*Primary Examiner*—Laura Weiner
(74) *Attorney, Agent, or Firm*—Stein, McEwen & Bui, LLP

(57) ABSTRACT

A nonaqueous electrolyte for use in improving overcharge safety in a lithium battery includes an organic solvent, a lithium salt, and a benzyl biphenyl compound, a hydride thereof or a mixture thereof.

18 Claims, 4 Drawing Sheets

NONAQUEOUS ELECTROLYTE COMPOSITION FOR IMPROVING OVERCHARGE SAFETY AND LITHIUM BATTERY USING THE SAME

CROSS-REFERENCE TO RELATED APPLICATIONS

This application claims the benefit of Korean Application Nos. 2001-64940 and 2001-64948, which were filed Oct. 20, 2001 in the Korean Intellectual Property Office, the disclosures of which are incorporated herein by reference.

BACKGROUND OF THE INVENTION

1. Field of the Invention

The present invention relates to a nonaqueous electrolyte for improving overcharge safety and a lithium battery using the same.

2. Description of the Related Art

According to the development of advanced electronic devices, there is an increasing demand for small, lightweight portable electronic devices and equipment. Thus, there is a need for batteries having high energy density characteristics so as to supply power to such devices and equipment. As such, research into such lithium batteries is currently being aggressively carried out.

A lithium battery comprises a cathode, an anode, an electrolyte, which provides a movement path for lithium ions between the cathode and anode, and a separator disposed between the cathode and the anode. Lithium batteries produce an electrical energy by intercalation/deintercalation of lithium ions during oxidation and reduction occurring at the cathode and the anode. However, where a battery is overcharged due to a malfunction of a charger, for example, a sharp rise in voltage occurs. During such a malfunction, excess lithium is precipitated at the cathode and excess lithium is intercalated into the anode. If both the cathode and the anode are thermally unstable, an organic solvent of the electrolyte is decomposed and causes rapid heat generation, such as thermal runaway. This adversely affects the safety of the battery.

To overcome the foregoing disadvantage, various attempts have been proposed to suppress overcharge of a battery by changing the composition of an electrolyte or by adding additives to the electrolyte. For example, U.S. Pat. No. 5,580,684 discloses a method of improving safety of a battery by increasing a self-extinguishing property of an electrolyte by adding phosphoric acid esters, such as trimethyl phosphate, tri(trifluoroethyl)phosphate or tri(2-chloroethyl)phosphate, to the electrolyte. U.S. Pat. No. 5,776,627 discloses a method of enhancing battery safety by preventing the migration of lithium by adding additives, such as thiophene, biphenyl or furan, to be polymerized in the event of battery failure, and by allowing a safety vent of the battery to be easily opened by the gas produced by the additives. Similarly, methods for enhancing battery safety are disclosed in U.S. Pat. Nos. 5,763,119, 5,709,968 and 5,858,573 in which an electrolyte includes additives such as 1,2-dimethoxy-4-bromo-benzene, 2-chloro-p-xyline and 4-chloro-anisol, and 2,7-diacetyl thianthrene, respectively. Japanese Patent Laid-Open Publication No. Hei 7-302614 discloses a battery protecting method in which overcharge current is consumed by forming a polymer using a benzene compound.

However, such conventional additives may be polymerized even under normal operating conditions or produce a large amount of gas due to oxidative decomposition, resulting in swelling of a battery. Also, use of such conventional additives may deteriorate various battery performance characteristics, such as formation, standard capacity or cycle life characteristics.

SUMMARY OF THE INVENTION

To solve the above and other problems, it is an object of the present invention to provide a nonaqueous electrolyte which improves battery safety by suppressing risks of rupture, ignition or explosion of a battery when the battery is overcharged due to uncontrolled conditions such as a failure of a charger or when the battery is exposed to high temperature, which can suppress swelling, and which can prevent deterioration in formation, standard capacity and cycle life characteristics of the battery.

It is another object of the present invention to provide a lithium battery with improved safety.

Additional objects and advantages of the invention will be set forth in part in the description which follows and, in part, will be obvious from the description, or may be learned by practice of the invention.

To accomplish the above and other objects, the present invention provides a nonaqueous electrolyte according to an embodiment of the invention which includes an organic solvent, a lithium salt, and a compound represented by Formula 1, a hydride thereof or a mixture thereof, where:

Formula 1 is

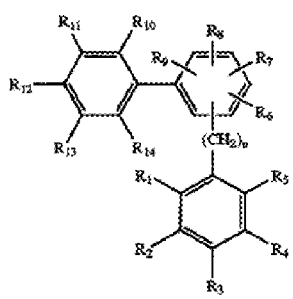

$R_1$, $R_2$, $R_3$, $R_4$, $R_5$, $R_6$, $R_7$, $R_8$, $R_9$, $R_{10}$, $R_{11}$, $R_{12}$, $R_{13}$ and $R_{14}$ are the same or different, and are independently hydrogen, hydroxy, halogen, a C1-C10 alkyl, a C1-C10 alkoxy, nitro or amine group, X is halogen, a C1-C10 alkyl, a C1-C10 alkoxy, nitro or amine group, and n is an integer between 1 and 10.

In another embodiment of the present invention, an amount of the compound represented by the Formula 1 is at or between 1 and 20% by weight based on a total amount of a mixed solution of the organic solvent and the lithium salt.

In yet another embodiment of the present invention, the degree of hydrogenation of the hydride of the compound represented by the Formula 1 is in a range at or between 10 and 70%.

In still another embodiment of the present invention, examples of the compound represented by the Formula 1 includes a compound represented by Formula 2, where:

Formula 2 is

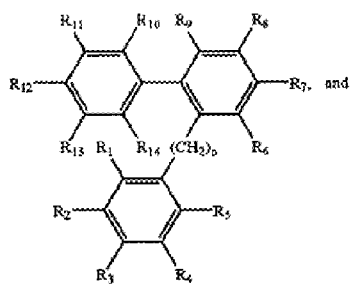

$R_1, R_2, R_3, R_4, R_5, R_6, R_7, R_{10}, R_{11}, R_{12}, R_{13}$ and $R_{14}$ and n are as defined above in relation to Formula 1.

According to still yet another embodiment of the present invention, examples of the compound represented by the Formula 2 include an o-benzyl biphenyl represented by Formula 3, where:

Formula 3 is

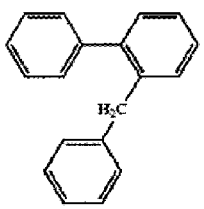

According to a further embodiment of the present invention, examples of the compound represented by the Formula 1 include a compound represented by Formula 4, where:

Formula 4 is

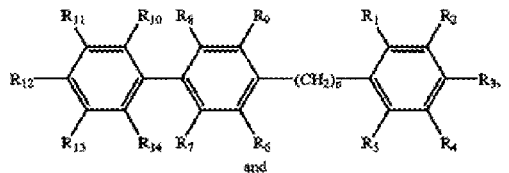

and $R_1, R_2, R_3, R_4, R_5, R_6, R_7, R_8, R_9, R_{10}, R_{11}, R_{12}, R_{13}$, and $R_{14}$ and n are as defined above in relation to Formula 1.

According to a still further embodiment of the present invention, examples of the compound represented by the Formula 4 include a p-benzyl biphenyl represented by Formula 5, where:

Formula 5 is

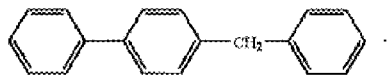

In accordance with an additional embodiment of the present invention, there is provided a lithium secondary battery using the nonaqueous electrolyte.

BRIEF DESCRIPTION OF THE DRAWINGS

Figure 4:
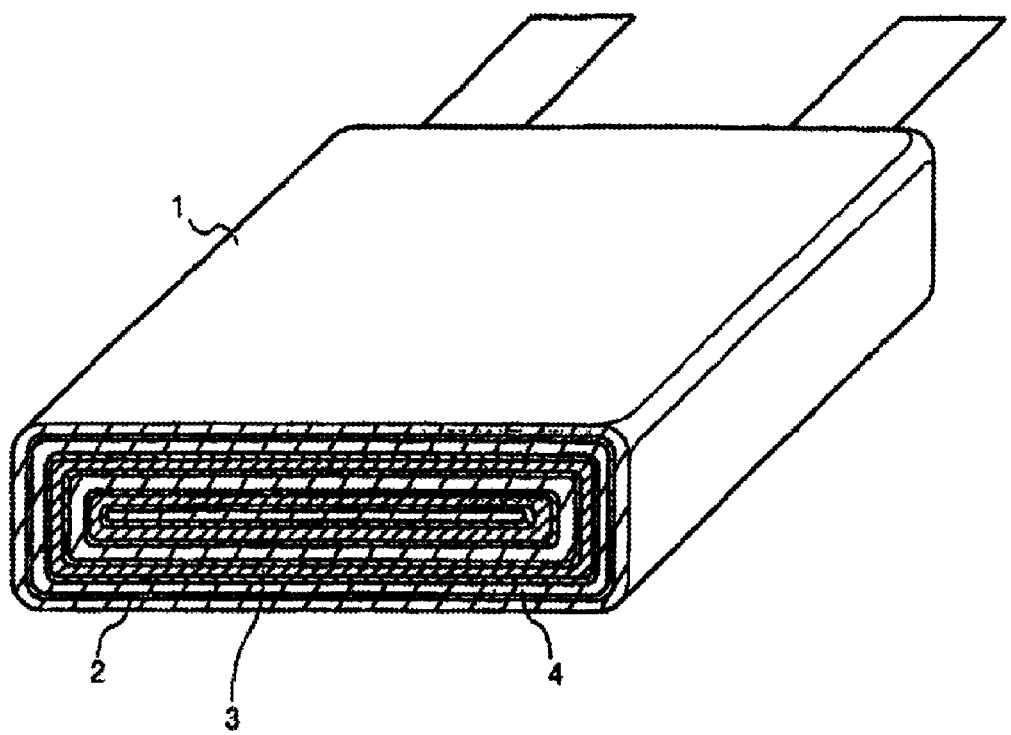

The above and other object and advantages of the present invention will become more apparent and more readily appreciated by describing in detail embodiments thereof with reference to the accompanying drawings in which:

FIG. 1 is a graph showing the results of an overcharge test for a battery using an electrolyte prepared in Comparative Example 1;

FIG. 2 is a graph showing the results of overcharge test for a battery using an electrolyte prepared in Example 1 of the present invention;

FIG. 3 shows cycle characteristics of batteries using electrolytes prepared in Example 5 and Comparative Example 2; and FIG. 4 shows a lithium battery according to an embodiment of the present invention.

DETAILED DESCRIPTION OF THE EMBODIMENTS

Reference will now be made in detail to the present embodiments of the present invention, examples of which are illustrated in the accompanying drawings and in Specific Examples, wherein like reference numerals refer to the like elements throughout. The embodiments are described below in order to explain the present invention by referring to the figures and the Specific Examples.

The present invention provides a nonaqueous electrolyte comprising an organic solvent, a lithium salt, and a compound represented by the Formula 1, a hydride thereof or a mixture thereof. Formula 1 is as follows:

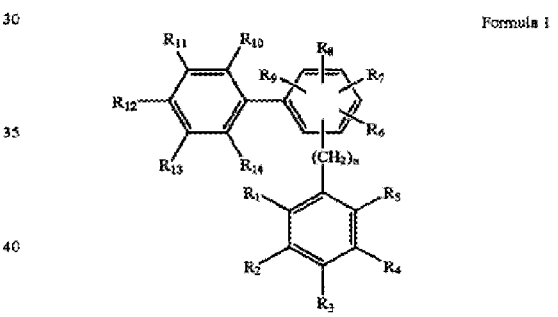

Formula 1

$R_1, R_2, R_3, R_4, R_5, R_6, R_7, R_8, R_9, R_{10}, R_{11}, R_{12}, R_{13}$ and $R_{14}$ are the same or different, and are independently hydrogen, hydroxy, halogen, a C1-C10 alkyl, a C1-C10 alkoxy, nitro or amine group, X is halogen, a C1-10 alkyl, a C1-C10 alkoxy, nitro or amine group, and n is an integer between 1 and 10.

Unlike conventional electrolyte additives, such as terphenyl, while the compound represented by the Formula 1 has little effect on battery performance under normal use conditions, (i.e., at 2.75-4.2 V) the additive is oxidized during an overcharge of a battery to cause polymerization at the surface of a cathode so that a coating is formed on the cathode surface. Accordingly, cathode-anode resistance increases and the polymerizable coating having some ionic and conductive properties causes a soft short (shunting) effect between the cathode and the anode, consuming overcharge current, thereby protecting the battery.

During overcharge, the gases generated due to the decomposition of the electrolyte react with a benzyl group to create a new substance. Thus, the present electrolyte additives considerably suppress gas generation as compared to conventional additives, thereby presumably preventing swelling of a battery. Therefore, use of an electrolyte having the compound represented by the Formula 1, a hydride thereof or a mixture thereof, and a lithium salt dissolved in an organic solvent, prevents deterioration of formation, standard capacity, swelling and cycle life characteristics while ensuring overcharge safety of the battery.

In particular, in the hydride of the compound represented by the Formula 1, an oxidative decomposition potential of an electrolyte moves further in a positive (+) direction than in the unhydrogenated compound. Thus, unfavorable side effects, such as polymerization, which may occur when the battery is used for a long period of time at normal conditions, can be further suppressed, thereby ensuring overcharge safety of the battery while preventing deterioration of formation, standard capacity, swelling and cycle life characteristics. The degree of hydrogenation of the hydride of the compound represented by the Formula 1 is in the range of 10 to 70%, and preferably in the range of 30 to 50%. If the degree of hydrogenation is less than 10%, the desired effects are difficult to achieve. If the degree of hydrogenation is greater than 70%, the oxidation currents are undesirably reduced.

The compound represented by the Formula 1, a hydride thereof or a mixture thereof, is added in an amount of 1 to 20% by weight, and preferably 3 to 15% by weight, based on the weight of a mixed solution of the organic solvent and the lithium salt. If the amount is less than 1%, the desired effects are difficult to achieve. If the amount is greater than 20%, the cycle life characteristics undesirably deteriorate.

The compound represented by the Formula 1 has a substituted or unsubstituted phenylalkyl group bound to a biphenyl group. The substituted or unsubstituted phenylalkyl group may be introduced at any of ortho (o), meta (m) and para (p) positions of the biphenyl group, but preferably is the o- or the p-position.

The compound with the phenylalkyl substituted at the o-position is represented by Formula 2, which is as follows:

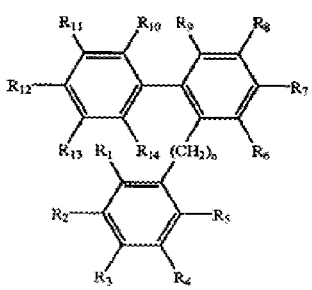

Formula 2

$R_1$, $R_2$, $R_3$, $R_4$, $R_5$, $R_6$, $R_7$, $R_8$, $R_9$, $R_{10}$, $R_{11}$, $R_{12}$, $R_{13}$ and $R_{14}$ and n are as defined above in relation to Formula 1.

The compound represented by the Formula 2 is preferably an o-benzyl biphenyl represented by Formula 3, which is as follows:

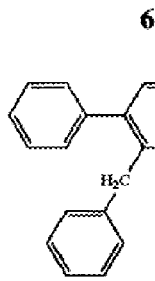

Formula 3

The compound with the phenylalkyl substituted at the p-position is represented by Formula 4, which is as follows:

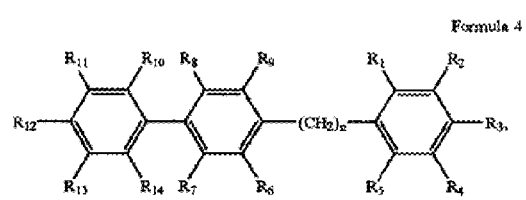

Formula 4 where
$R_1$, $R_2$, $R_3$, $R_4$, $R_5$, $R_6$, $R_7$, $R_8$, $R_9$, $R_{10}$, $R_{11}$, $R_{12}$, $R_{13}$ and $R_{14}$ and n are the same above.

The compound represented by the Formula 4 is preferably the p-benzyl biphenyl represented by Formula 5, which is as follows:

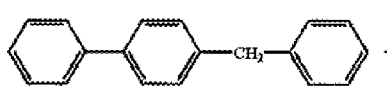

Formula 5

Any organic solvent useful for the electrolytes can be generally used for manufacture of lithium batteries without particular limitation. Examples thereof include at least one selected from the group consisting of ethylene carbonate, propylene carbonate, dimethyl carbonate, diethyl carbonate, dipropyl carbonate, ethylmethyl carbonate, dimethyl sulfoxide, acetonitrile, dimethoxyethane, tetrahydrofuran, acetone, dimethylformamide, cyclohexanone, fluorobenzene and N-methyl-2-pyrrolidone. The content of the organic solvent is in a range typically used in the manufacture of lithium batteries.

Lithium salts useful for the electrolyte include, but are not limited to, any lithium compounds capable of being dissociated in an organic solvent to produce lithium ions. Examples thereof include at least one ionic lithium salt selected from the group consisting of lithium perchloric acid ($LiClO_4$), lithium tetrafluoroboric acid ($LiBF_4$), lithium hexafluorophosphoric acid ($LiPF_6$), lithium trifluoromethanesulfonic acid ($LiCF_3SO_3$) and lithium bis(trifluoromethanesulfonyl)amide ($LiN(CF_3SO_2)_2$). The content of the lithium salt is in a range typically used in the manufacture of lithium batteries. The organic electrolyte containing an inorganic salt serves as a path for moving lithium ions in a direction of current flow.

The electrolyte can be used for any method of manufacturing lithium batteries without limitation. Exemplary manufacturing methods are as follows:

(1) An electrode assembly including an anode, a cathode and a separator is put into a battery case and the electrolyte is inserted into the electrode assembly, thereby completing a lithium battery;

(2) A polymer electrolyte is prepared by mixing a matrix-forming polymer resin and the electrolyte, which is then applied to an electrode (i.e., the cathode or anode) or a separator, the cathode, anode, and separator are combined to form an electrode assembly, and the electrode assembly is put into a battery case, thereby completing a lithium battery; or (3) A polymer electrolyte composition comprising a pre-polymer or polymerizable monomer as a matrix-forming resin and an electrolyte is applied to an electrode (i.e., the cathode or anode) or a separator, the cathode, anode, and separator are combined to form an electrode assembly, the electrode assembly is put into a battery case and then polymerization is carried out, thereby completing a lithium battery.

Any separator that can be generally used in manufacturing lithium batteries is used without any limitations. Examples thereof include a polyethylene or polypropylene porous layer less reactive with an organic solvent and suitable for attaining a safe battery. Examples of the matrix forming polymer resin include, but are not limited to, any material useful for a binder of an electrode plate. Specific examples include a vinylidenefluoride/hexafluoropropylene copolymer, polyvinylidenefluoride, polyacrylonitrile, polymethylmethacrylate and mixtures thereof.

The polymer electrolyte may further include a polymer filler. The polymer filler serves to enhance the mechanical strength of the polymer electrolyte. Examples of the filler include silica, kaolin and alumina.

The polymer electrolyte may further include a plasticizer. Examples of the plasticizer include ethylene glycol derivatives, oligomers thereof and organic carbonates. Examples of the ethylene glycol derivatives include ethylene glycol diacetate, ethylene glycol dibutylether, ethylene glycol dibutyrate, ethylene glycol dipropionate, propylene glycol methyletheracetate and mixture thereof. Examples of the organic carbonates include ethylene carbonate, propylene carbonate, diethyl carbonate, dimethyl carbonate, and mixtures thereof.

The alkyl used for the compound of the present invention includes a straight-chain or branched radical having 1-10 carbon atoms, and preferably has 1-8 carbon atoms. Examples of such radicals include methyl, ethyl, n-propyl, isopropyl, n-butyl, isobutyl, sec-butyl, t-butyl, pentyl, isoamyl, hexyl, octyl and the like, and preferably include a lower alkyl radical having 1-4 carbon atoms.

The alkoxy used for the compound of the present invention includes straight-chain or branched oxygen-containing radical having a C1-C10 alkyl, and preferably include a lower alkoxy radical having 1-6 carbon atoms. Examples of such radicals include methoxy, ethoxy, propoxy, butoxy, t-butoxy and the like, and preferably includes a lower alkoxy radical having 1-4 carbon atoms. The alkoxy radical is further substituted with one or more halo atoms such as fluoro, chloro or bromo to provide a haloalkoxy radical, and preferably a lower haloalkoxy having 1-4 carbon atoms. Examples of such haloalkoxy radicals include fluoromethoxy, chloromethoxy, trifluoromethoxy, trifluoroethoxy, fluoroethoxy and fluoropropoxy and the like.

The lithium battery containing the electrolyte according to the present invention is not particularly limited in its type and can be applied to primary batteries, secondary batteries or lithium sulfur batteries. The lithium battery containing the electrolyte according to the present invention is not particularly limited in its shape and can be applied to both rectangular and cylindrical batteries.

To further illustrate the present invention in greater detail, the following specific Examples will be given. However, it is to be understood that the present invention is not restricted thereto.

Preparation of a Cathode

A mixture (slurry or paste) is prepared by dissolving LiCoO$_2$, which is used as a cathode active material, Super-P (manufactured by M.M.M. Corp.), which is used as a conductive agent, and polyvinylidenefluoride (PVDF), which is used as a binder, in N-methyl-2-pyrrolidone (NMP) which is used as an organic solvent. The mixture was uniformly applied onto both surfaces of an aluminum current collector to prepare a cathode coated with an active material. The coated current collector was dried to remove the organic solvent and was compression molded using a roll press machine, thereby manufacturing a cathode having a 0.147 mm thickness.

Manufacture of an Anode

A mixture (slurry or paste) was prepared by dissolving mesocarbon fiber (MCF) (manufactured by PETOCA LTD.), which is used as an anode active material, and PVDF, which is used as a binder, in NMP which is used as an organic solvent. The mixture was applied onto both surfaces of a copper current collector to prepare an anode coated with an active material. The coated current collector was dried to remove the organic solvent, and compression molded using a roll press machine, thereby manufacturing an anode having a 0.178 mm thickness.

Preparation of an Electrode Assembly

The manufactured cathode and anode were stacked with a polyethylene porous layer, which is less reactive with an organic solvent and is suitably thick (i.e., 0.024 mm) disposed therebetween, thereby fabricating a rectangular battery having a capacity of approximately 900 mAh.

Preparation of an Electrolyte

Example 1

LiPF$_6$ as a lithium salt was dissolved to a final concentration of 1.15 M in a mixed solvent of ethylene carbonate (EC)/ethylmethyl carbonate (EMC)/propylene carbonate (PC)/fluorobenzene (FB) (volume ratio=30/55/5/10) to obtain a mixed solution. To the obtained mixed solution was added 3% by weight of an o-benzyl biphenyl represented by Formula 3, based on a total amount of the mixed solution, thereby obtaining a desired electrolyte. Formula 3 is as follows:

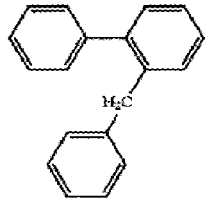

Formula 3

Example 2

LiPF$_6$ as a lithium salt was dissolved to a final concentration of 1.15 M in a mixed solvent of EC/EMC/PC/FB (volume ratio=30/55/5/10) to obtain a mixed solution. To the obtained mixed solution was added 5% by weight of the o-benzyl biphenyl represented by the Formula 3, based on the total amount of the mixed solution, thereby obtaining a desired electrolyte.

Example 3

$LiPF_6$ as a lithium salt was dissolved to a final concentration of 1.15 M in a mixed solvent of EC/EMC/PC/FB (volume ratio=30/55/5/10) to obtain a mixed solution. To the obtained mixed solution was added 10% by weight of the o-benzyl biphenyl represented by the Formula 3, based on the total amount of the mixed solution, thereby obtaining a desired electrolyte.

Example 4

$LiPF_6$ as a lithium salt was dissolved to a final concentration of 1.15 M in a mixed solvent of EC/EMC/PC/FB (volume ratio=30/55/5/10) to obtain a mixed solution. To the obtained mixed solution was added 5% by weight of a hydride of the o-benzyl biphenyl represented by the Formula 3 (30% in degree of hydrogenation, manufactured by NIPPON STEEL CHEMICAL CO.), thereby obtaining a desired electrolyte.

Example 5

$LiPF_6$ as a lithium salt was dissolved to a final concentration of 1.15 M in a mixed solvent of EC/EMC/PC/FB (volume ratio=30/55/5/10) to obtain a mixed solution. To the obtained mixed solution was added 5% by weight of a hydride of the o-benzyl biphenyl represented by the Formula 3 (50% in degree of hydrogenation, manufactured by NIPPON STEEL CHEMICAL CO.), thereby obtaining a desired electrolyte.

Example 6

$LiPF_6$ as a lithium salt was dissolved to a final concentration of 1.15 M in a mixed solvent of EC/EMC/PC/FB (volume ratio=30/55/5/10) to obtain a mixed solution. To the obtained mixed solution was added 10% by weight of a hydride of the o-benzyl biphenyl represented by the Formula 3 (50% in degree of hydrogenation, manufactured by NIPPON STEEL CHEMICAL CO.), thereby obtaining a desired electrolyte.

Comparative Example 1

$LiPF_6$ as a lithium salt was mixed to a final concentration of 1.15 M in a mixed solvent of EC/EMC/PC/FB (volume ratio=30/55/5/10) to obtain a desired electrolyte.

Comparative Example 2

$LiPF_6$ as a lithium salt was mixed to a final concentration of 1.15 M in a mixed solvent of EC/EMC/PC/FB (volume ratio=30/55/5/10) to obtain a mixed solution. To the mixed solution was added 5% by weight of an o-terphenyl, thereby obtaining a desired electrolyte.

Preparation of the Lithium Ion Battery

A separator was disposed between the cathode and anode to prepare an electrode assembly, and the resultant structure was wound, compressed, and placed into a 34 mm×50 mm×6 mm rectangular can. Each of the obtained electrolytes was injected into the respective cans, thereby preparing lithium ion batteries.

Test Example 1: Overcharge Test

The prepared lithium ion batteries were charged with a charging current of 950 mA (1 C) at room temperature to a voltage of 4.2 V, and charged for 3 hours at a constant voltage of 4.2 V to reach a fully charged state. Overcharging was performed by applying a charging current of 950 mA (1 C) between a cathode and an anode of each fully charged battery for approximately 2.5 hours, and changes in charging voltage and temperature were observed.

FIG. 1 shows overcharge test results on the lithium ion battery prepared in Comparative Example 1 with a charging current of 950 mA (1 C). As shown in FIG. 1, when an external voltage of 12 V was applied, separator shutdown may be resulted from an exhaustion of the electrolyte or a temperature rise due to the oxidation between a cathode/anode and an electrolyte. Also, when a high current of approximately 1 C is applied to the lithium ion battery, thermal runaway occurs to the battery to cause dissolution of a separator, resulting in internal short, and heat or fire.

FIG. 2 shows overcharge test results performed on the lithium ion battery prepared in Example 1 under the same conditions as in Comparative Example 1. As shown in FIG. 2, polymerization takes place due to an additive of the present invention at approximately 10 minutes after the overcharge test, so that the temperature rises. However, since the overcharging current is continuously consumed, a voltage rise is suppressed at approximately 5 V. Also, since the heat generation due to oxidative decomposition of an electrolyte and battery materials is also suppressed, the temperature of a battery surface is controlled to be approximately 50° C. or below. Since thermal runaway is fundamentally suppressed, battery safety can be ensured.

Test Example 2: Formation and Swelling Characteristics

Observations of the formation capacity, the standard capacity and the swelling characteristics before and after the formation were carried out on the batteries prepared in Examples 1-6 and Comparative Examples 1 and 2 and the results thereof are listed in Table 1. The batteries were charged at 0.2 C to a voltage of 4.2 V and then were discharged at 0.2 C to an end voltage of 2.75 V. To determine swelling characteristics, thicknesses of the batteries were measured.

Test Example 3: High-Rate Characteristics

High-rate (2 C) characteristics of the batteries prepared in Examples 1-6 and Comparative Examples 1-2 were measured and the results thereof are listed In Table 1.

TABLE 1

| | Swelling before and after formation | Formation capacity | | | | High-rate (2C) discharge capacity | |
|---|---|---|---|---|---|---|---|
| | | Charge | Discharge | Efficiency (%) | Capacity (mAh) | Capacity | Standard (%) |
| Example 1 | 5.07 | 934.82 | 891.06 | 95.32 | 951.83 | 911.80 | 95.79 |
| Example 2 | 5.07 | 970.84 | 905.66 | 93.29 | 944.82 | 908.79 | 96.19 |
| Example 3 | 5.07 | 985.70 | 931.26 | 94.48 | 960.42 | 920.33 | 95.82 |
| Example 4 | 5.07 | 990 | 930 | 94 | 945 | 905 | 96 |
| Example 5 | 5.06 | 960 | 930 | 97 | 960 | 925 | 96 |
| Example 6 | 5.08 | 980 | 910 | 93 | 930 | 885 | 96 |
| Comparative Example 1 | 5.09 | 958.85 | 883.64 | 92.15 | 934.40 | 895.91 | 95.88 |
| Comparative Example 2 | 5.75 | 939 | 865 | 92 | 851 | 798 | 93 |

As shown in Table 1, the lithium battery prepared in Comparative Example 2, containing a conventional overcharge preventing additive, is higher than that prepared in Comparative Example 2 in view of degree of swelling. This difference is because a large amount of gas is produced due to oxidative decomposition of the overcharge preventing additive.

However, the lithium batteries prepared in Examples 1-6 in which overcharge preventing additives of the present invention are used, show substantially the same degree of swelling compared to the lithium battery prepared in Comparative Example 1. That is to say, the additives of the present invention suppress swelling.

The lithium batteries according to the present invention are also highly effective in view of formation and standard capacity characteristics.

Test Example 4: Cycle Life Characteristics

Charge/discharge cycle life characteristics were tested on the lithium batteries prepared in Example 5 and Comparative Example 2. Charge/discharge cycling tests were carried out under the conditions of constant current and constant voltage at 1 C and to 2.7-4.2 V. The constant voltage period was 1/10 the constant current period. The capacity and charge/discharge cycle life characteristics of the batteries are shown in FIG. 3. As shown in FIG. 3, the lithium battery using the overcharge preventing additive of Example 5 was proven to have higher capacity after 50 cycles, (i.e., better cycle life characteristics) than the lithium battery using the conventional overcharge preventing additive.

As shown in FIG. 4, a lithium battery according to an embodiment of the present invention includes a case 1 containing a positive electrode (i.e., a cathode) 3, a negative electrode (i.e., an anode) 4, and a separator 2 interposed between the positive electrode 3 and the negative electrode 4. The nonaqueous electrolyte of the present invention is disposed between the positive and negative electrodes 3, 4. It is understood that, where the electrolyte is a polymer electrolyte, that the polymer electrolyte can be used as the separator 2.

As described above, the nonaqueous electrolyte according to the present invention forms a polymer due to its oxidative decomposition even if there is an increase in voltage due to overcharge of a battery by some uncontrollable conditions, so that overcharge current is continuously consumed, thereby protecting the battery. Therefore, overcharge safety of the battery can be enhanced, and occurrence of swelling is reduced. Also, deterioration in formation, standard capacity and cycle life characteristics can be prevented. Further, the nonaqueous electrolyte according to the present invention can be advantageously applied to lithium batteries and the like.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A nonaqueous electrolyte comprising:
   an organic solvent;
   a lithium salt; and
   a compound represented by Formula 1, a hydride thereof or a mixture thereof wherein:

Formula 1 is

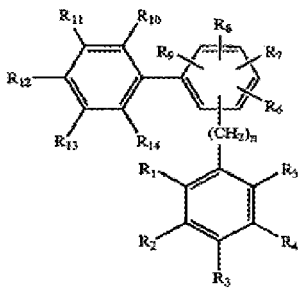

$R_1$, $R_2$, $R_3$, $R_4$, $R_5$, $R_6$, $R_7$, $R_8$, $R_9$, $R_{10}$, $R_{11}$, $R_{12}$, $R_{13}$ and $R_{14}$ are the same or different, and are independently hydrogen, hydroxy, halogen, a C1-C10 alkyl, a C1-C10 alkoxy, nitro or amine group, X is halogen C1-C10 alkyl, a C1-C10 alkoxy, nitro or amine group, and n is an integer between 1 and 10.

2. The nonaqueous electrolyte according to claim 1, wherein an amount of the compound represented by the Formula 1 is at or between 1 and 20% by weight based on a total amount of a mixed solution of the organic solvent and the lithium salt.

3. The nonaqueous electrolyte according to claim 2, wherein the amount of the compound represented by the Formula 1 is at or between 3 and 15% by weight based on the total amount of a mixed solution of the organic solvent and the lithium salt.

4. The nonaqueous electrolyte according to claim 1, wherein a degree of hydrogenation of the hydride of the compound represented by the Formula 1 is in a range at or between 10 and 70%.

5. The nonaqueous electrolyte according to claim 4, wherein the degree of hydrogenation is in the range at or between 30 and 50%.

6. The nonaqueous electrolyte according to claim 1, wherein:
the compound represented by the Formula 1 includes a compound represented by Formula 2, Formula 2 is

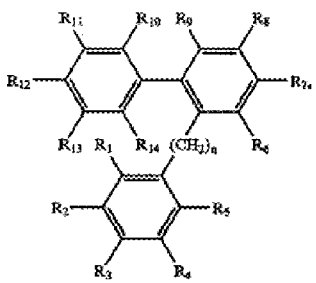

$R_1, R_2, R_3, R_4, R_5, R_6, R_7, R_8, R_9, R_{10}, R_{11}, R_{12}, R_{13}$ and $R_{14}$ and n are as defined in relation to Formula 1.

7. The nonaqueous electrolyte according to claim 6, wherein:
the compound represented by the Formula 2 includes an o-benzyl biphenyl represented by Formula 3, and Formula 3 is

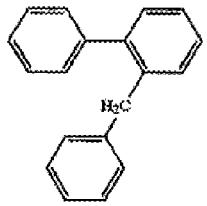

8. The nonaqueous electrolyte according to claim 1, wherein:
the compound represented by the Formula 1 includes a compound represented by Formula 4, Formula 4 is

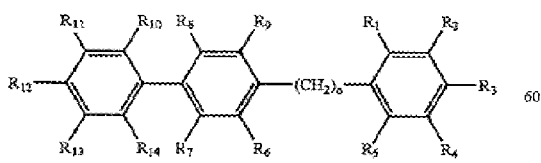

and
$R_1, R_2, R_3, R_4, R_5, R_6, R_7, R_8, R_9, R_{10}, R_{11}, R_{12}, R_{13}$ and $R_{14}$ and n are as defined in relation to Formula 1.

9. The nonaqueous electrolyte according to claim 8, wherein:
the compound represented by the Formula 4 includes a p-benzyl biphenyl represented by Formula 5, and Formula 5 is

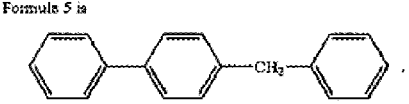

10. The nonaqueous electrolyte according to claim 1, wherein the organic solvent comprises ethylene carbonate, propylene carbonate, dimethyl carbonate, diethyl carbonate, dipropyl carbonate, ethylmethyl carbonate, dimethyl sulfoxide, acetonitrile, dimethoxyethane, tetrahydrofuran, acetone, dimethylformamide, cyclohexanone, fluorobenzene, or N-methyl-2-pyrrolidone.

11. The nonaqueous electrolyte according to claim 1, wherein the lithium salt comprises lithium perchloric acid ($LiClO_4$), lithium tetrafluoroboric acid ($LiBF_4$), lithium hexafluorophosphoric acid ($LiPF_6$), lithium trifluoromethanesulfonic acid ($LiCF_3SO_3$), or lithium bis (trifluoromethanesulfonyl)amide ($LiN(CF_3SO_2)_2$).

12. A lithium battery comprising:
an anode;
a cathode which intercalates lithium ions with the anode;
a separator disposed between the anode and the cathode; and
a nonaqueous electrolyte disposed between the anode and the cathode and which comprises the nonaqueous electrolyte according to claim 1.

13. A lithium battery comprising:
an anode;
a cathode which intercalates lithium ions with the anode;
a separator disposed between the anode and the cathode; and
a nonaqueous electrolyte disposed between the anode and the cathode and which comprises the nonaqueous electrolyte according to claim 2.

14. A lithium battery comprising:
an anode;
a cathode which intercalates lithium ions with the anode;
a separator disposed between the anode and the cathode; and
a nonaqueous electrolyte disposed between the anode and the cathode and which comprises the nonaqueous electrolyte according to claim 4.

15. A lithium battery comprising:
an anode;
a cathode which intercalates lithium ions with the anode;
a separator disposed between the anode and the cathode; and
a nonaqueous electrolyte disposed between the anode and the cathode and which comprises the nonaqueous electrolyte according to claim 6.

16. A lithium battery comprising:
an anode;
a cathode which intercalates lithium ions with the anode;
a separator disposed between the anode and the cathode; and
a nonaqueous electrolyte disposed between the anode and the cathode and which comprises the nonaqueous electrolyte according to claim 7.

17. A lithium battery comprising:

an anode;

a cathode which intercalates lithium ions with the anode;

a separator disposed between the anode and the cathode; and a nonaqueous electrolyte disposed between the anode and the cathode and which comprises the nonaqueous electrolyte according to claim 8.

18. A lithium battery comprising:

an anode;

a cathode which intercalates lithium ions with the anode;

a separator disposed between the anode and the cathode; and a nonaqueous electrolyte disposed between the anode and the cathode and which comprises the nonaqueous electrolyte according to claim 9.

* * * * *